Patented Dec. 29, 1953

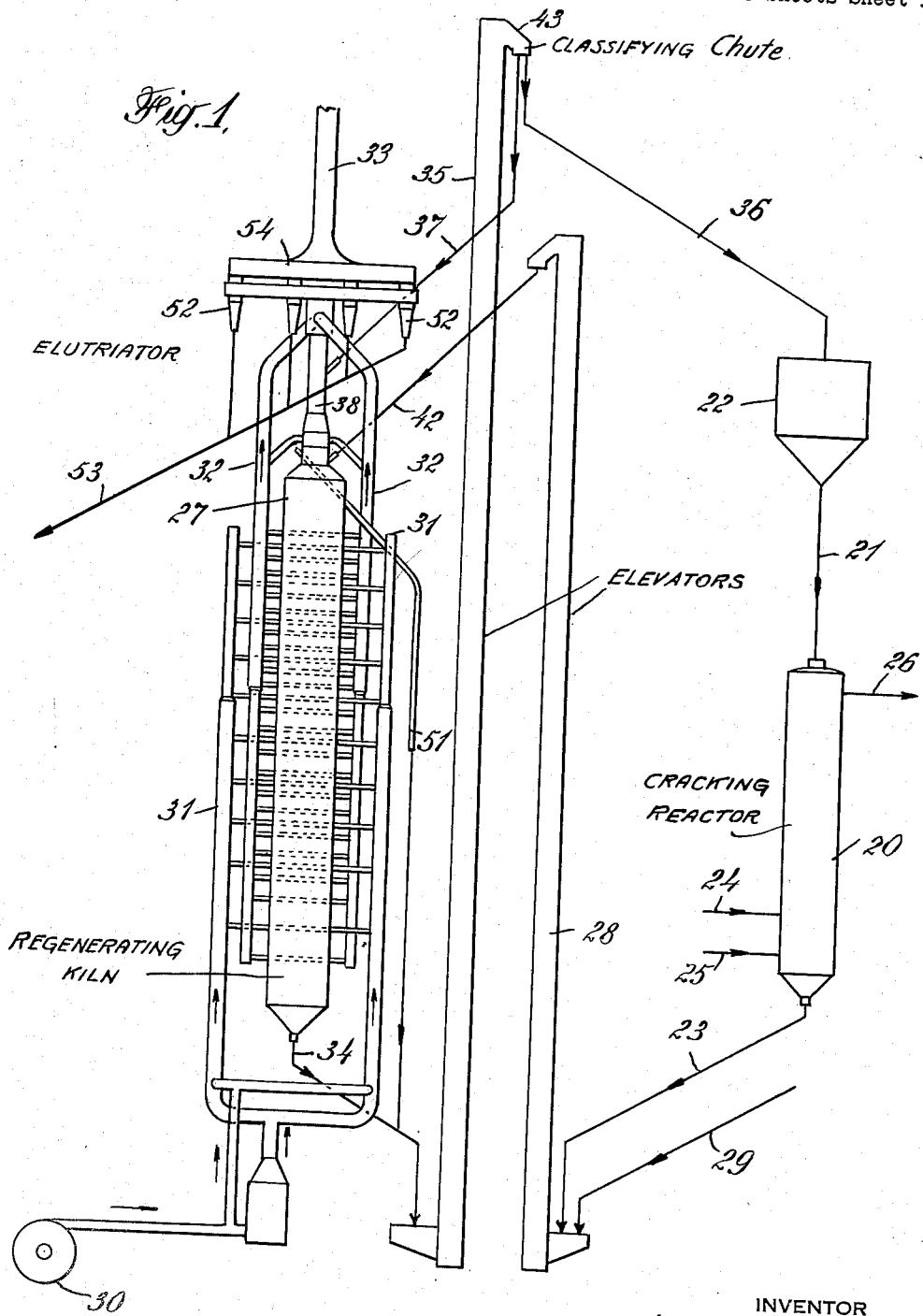

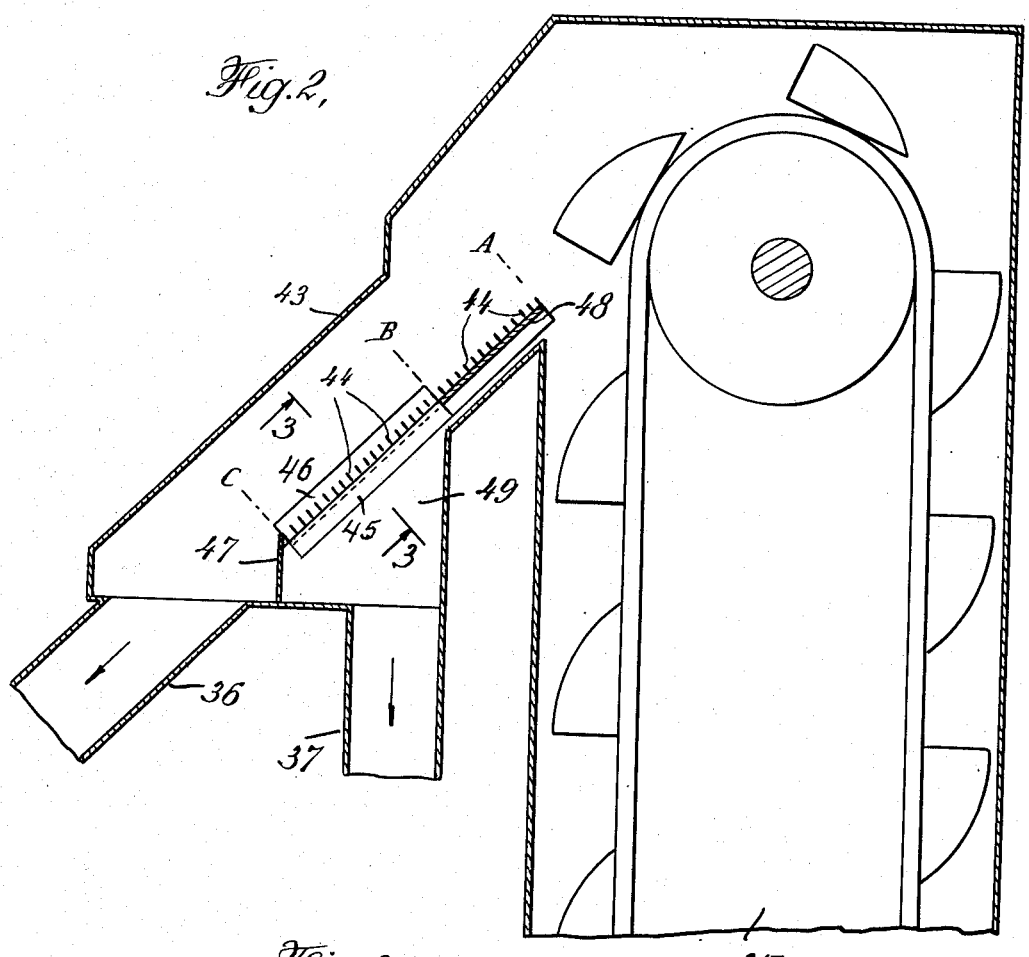
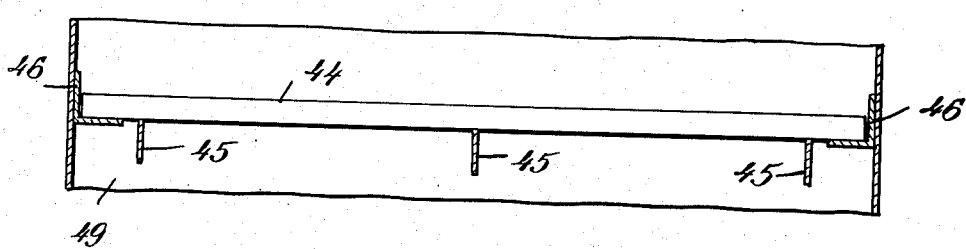

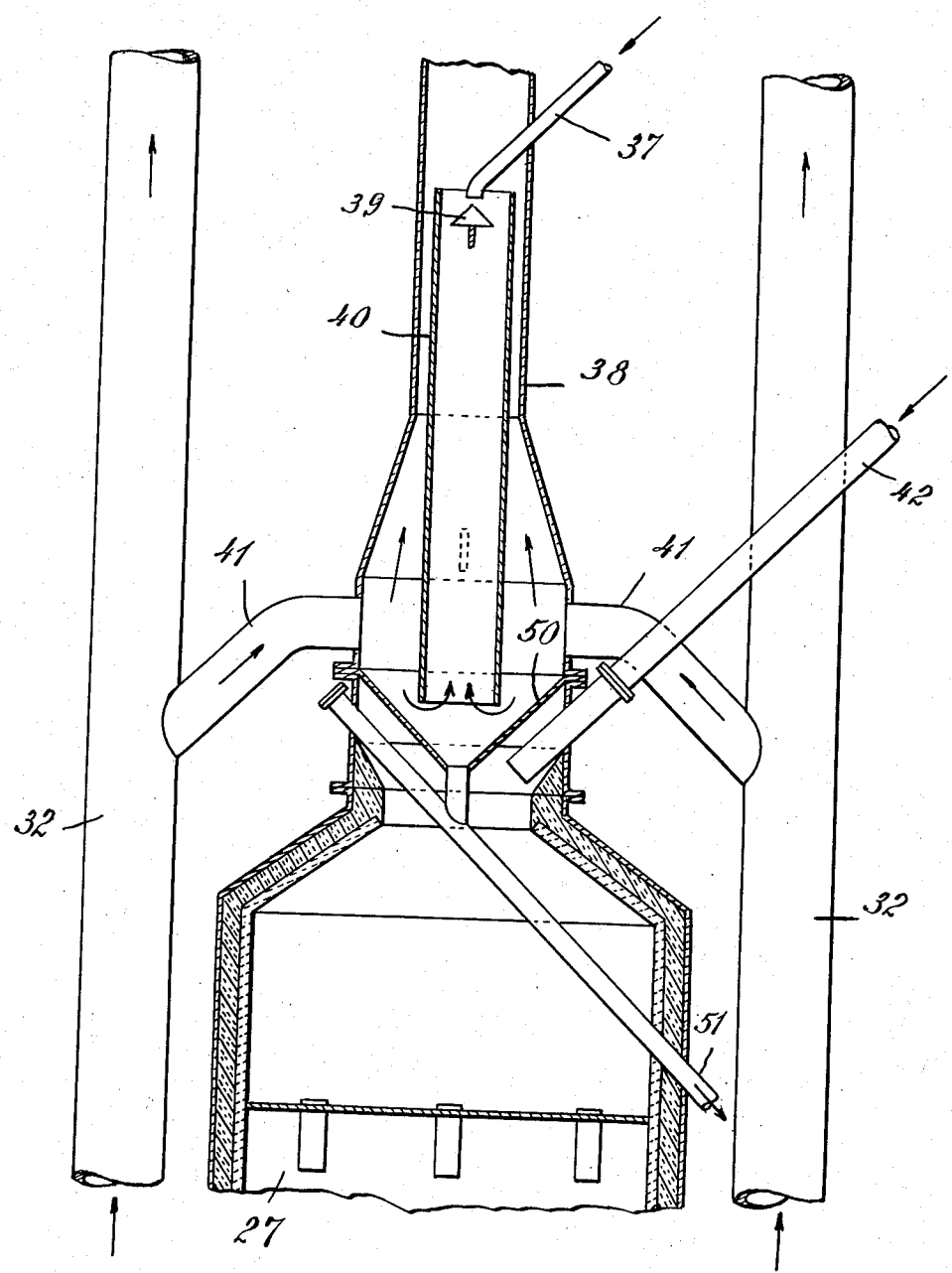

2,664,387

UNITED STATES PATENT OFFICE 2,664,387

PROCESS AND APPARATUS FOR CATALYST CLASSIFICATION IN A MOVING BED CATALYST CONVERSION PROCESS FOR HYDROCARBONS

Leroy F. Strader, Long Beach, Calif., assignor, by mesne assignments, to Houdry Process Corporation, Wilmington, Del., a corporation of Delaware Application May 22, 1945, Serial No. 595,148

2 Claims. (Cl. 196—52)

My invention relates to improvements in the classification, in connection with the elimination of fines, of catalysts used to promote the cracking of hydrocarbons. My invention relates more particularly to improvements in apparatus for the classification of cracking catalysts in systems comprising a cracking reactor, a regenerating kiln, an elutriator for eliminating fines and one or more elevators for lifting catalysts circulating within the system.

In the operation of such systems the catalyst, natural or synthetic, is usually supplied in the form of cylindrical or spherical pellets, having for example, a volume equivalent to that of spheres with diameters of the order of $\frac{1}{8}''$ – $\frac{3}{16}''$. The reactions involved in operation, the deposit of coke on the catalyst in the cracking reactor and the combustion of deposited coke in the regenerating kiln, and the movement of the catalyst through the system involve physical degradation of the pellets with production of fines. Thus, the catalyst circulating in the system in normal operation is a mixture of pellets and smaller particles resulting from degradation of the pellets. Since the small particles or fines are objectionable in a number of respects, in such systems, and since fines accumulate as the operation continues, the elimination of fines controlled to maintain some chosen maximum concentration of fines is an essential part of such operations. Hitherto this has been accomplished by diverting an aliquot portion of the circulating catalyst, usually of the catalyst moving from the regenerating kiln to the cracking reactor, through a classifying device, an elutriator, to separate small particles from the relatively large pellets comprised by this diverted portion, the separated small particles being eliminated as fines and the pellets being returned to the system, the portion diverted being kept as small as possible consistent with the maintenance of the chosen maximum concentration of fines in the circulating catalyst. In such operations it will be apparent that the classifying device must do much work which would not be necessary if the diverted portion of the circulating catalyst were selectively separated to contain a higher than average proportion of small particles. On the other hand, it will be apparent that such a selective separation would involve classification of the whole of the circulating catalyst.

I have discovered that an extremely rapid classification of such catalyst material occurs as it begins to move through a downwardly inclined chute if an appropriate opportunity for separation of fines concentrating in that part of the stream of catalyst immediately adjacent to the floor of the chute is provided. I have applied my discovery with remarkable improvement of efficiency in the separation and elimination of fines in such systems. In one such system with which I had been working, grids made up of parallel flat steel straps arranged on edge and across the path of catalyst movement and spaced in the direction of catalyst movement were installed on the floors of the discharge chutes from the upper ends of the elevators to assist in controlling rather severe erosion of the chute floor which occurred at this point. The several straps making up these grids kept a layer of catalyst material on the floor of the chute at this point so that the surface subjected to erosion was a surface of the catalyst material which was continually being replaced rather than the metal chute floor. Although these grids were but a few feet in length in the direction of catalyst movement through the chute, I noticed that a high proportion of the material separating in the spaces between the straps forming the grid consisted of small particles even though the distance between the straps was several times the diameter of the larger catalyst pellets. I then modified the chute construction to permit the removal through the chute floor of the material separating in the grid from the stream of circulating catalyst and I found that I had the means to effect a preliminary classification of the whole of the circulating catalyst as it passed this point in the system enabling me selectively to separate, for diversion to the elutriator, a portion containing a substantially higher than average proportion of small particles, with virtually no additional equipment, with but a minor rearrangement of the discharge chute from one of the elevators, and without any burden upon the operation.

The improved apparatus of my invention comprises a downwardly inclined discharge chute from the upper end of one of the elevators for lifting circulating catalyst, a grid extending across the lower part of the chute with transverse apertures large enough to pass pellets as well as the small particles of catalyst, and a connection for transferring a minor portion of the total material passing down the chute, containing a higher proportion of small particles than the catalyst lifted by the elevator, to the elutriator. Pellets, and larger particles, thus transferred, to the elutriator with the diverted minor portion selectively separated from the circulating catalyst, are separated from the fines in the elutriator, the fines are eliminated from the system, and the pellets and larger particles separated in the elutriator are returned to the system. Such pellets and larger particles are with advantage returned to the same elevator discharging into the classifying chute.

The accompanying drawings illustrate a system embodying my invention. Although diagrammatic and conventional, these drawings are in general of scale proportions. Referring to these drawings:

Fig. 1 is a diagram of a cracking system of the type to which my invention relates;

Fig. 2 is an enlarged fragmentary section through the head end of the higher elevator illustrated in Fig. 1;

Fig. 3 is a fragmentary section on line 3—3 in Fig. 2; and

Fig. 4 is an enlarged fragmentary section through the upper end of the regenerating kiln illustrated in Fig. 1.

Referring to Fig. 1 which is a diagram of the cracking system as a whole: A charge of catalyst is maintained in a cracking reactor 20, the regenerated catalyst being supplied from a storage chamber 22 through connection 21 and spent catalyst being discharged through connection 23. The temperature in the reactor may approximate, for example, 900–975° F. and the pressure in the reactor may approximate 6–10 lbs. per square inch gauge. Connection 21 is made long enough to serve as a seal. The hydrocarbons to be cracked are introduced into the cracking reactor as a vapor mixture through connection 24. Steam to strip the spent catalyst leaving the reactor of the vaporizable material is introduced through connection 25. The cracked hydrocarbons together with any uncracked material and the stripping steam leave the reactor as a vapor mixture through connection 26. Spent catalyst is lifted to the top of the regenerating kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of ten bodies in a corresponding series of zones through which air is blown by means of blower 30 and distributing manifolds 31 with appropriate connections to each of the several zones. The products of combustion escape from each of the several zones through manifolds 32, ultimately escaping through stack 33. Each of the ten zones is generally defined by a double connection to the manifolds 31 and a pair of double connections to the stack manifolds 32, one above and one below the double connection to the air manifolds 31. The regenerated catalyst discharged from the lower end of the kiln through connection 34 is lifted to the catalyst storage chamber 22 by means of bucket elevator 35.

In conventional practice, an aliquot portion of the regenerated catalyst discharged at the head end of elevator 35 is diverted through connection 37 to an elutriator 38, the bulk of the catalyst passing directly to chamber 22 through connection 36. Thus, that portion of the catalyst supplied to the cracking reactor has the same average fines content as the catalyst lifted by the elevator, and the fines content of the catalyst material delivered to the elutriator also is the same as that of the catalyst lifted by the elevator and supplied to the cracking reactor. In the apparatus of my invention, however, a preliminary classification is effected in the discharge chute at the head end of the elevator lifting the regenerated catalyst whereby the portion of the catalyst diverted to the elutriator is concentrated with respect to fines, the diverted portion of the catalyst material containing a higher proportion of fines than the catalyst material lifted by the elevator and the catalyst material supplied to the cracking reactor containing a lower proportion of fines than that lifted by the elevator.

Referring more particularly to Figs. 2, 3 and 4, without however excluding reference to Fig. 1 to illustrate the position and arrangement of the illustrated parts in the system as a whole: A discharge chute 43 is arranged at the head end of the elevator 35. A grid made up of parallel flat steel straps 44 arranged on edge and across the path of catalyst movement and spaced in the direction of catalyst movement, this grid extending across the lower part of the chute, is supported in the same position it would occupy if it were arranged on the floor of the chute in conventional practice. The several straps making up the grid are, for example, welded to longitudinal braces 45 which may be in the form of bars, as illustrated, or in the form of angles, channels or tees. The grids are supported in the chute by angles 46 secured to the side walls of the chute and by a transverse partition 47 at the lower end of the grid. From A to B (in Fig. 2) the grid apertures are closed on their lower side by a floor member 48. From B to C, the grid apertures open into a box or receptacle 49 communicating with connection or conduit 37. The material passing through the grid is discharged through connection 37 and the material passing over the grid is discharged through connection or conduit 36. The grid apertures are large enough to pass pellets as well as small particles of catalyst. The size of conduit 37 is such that the bulk of the catalyst passes over the grid, to connection 36, while a minor portion passes through it to connection 37. Due to the extremely rapid classification previously described, the minor portion of catalyst material passing through the grid to the connection 37 contains a considerably higher proportion of small particles or fines than the catalyst material lifted by the elevator 35.

For example, in apparatus such as that illustrated, with a grid made up of straps 1″ x ⅛″ spaced 1″ on centers (thus providing a ⅞″ gap), 4 ft. wide, 18″ from A to B and 24″ from B to C and inclined at 45° circulating 150 tons per hour of a synthetic aluminum silicate catalyst supplied as spheroidal pellets averaging ⅛″–³⁄₁₆″ in diameter, I have effected a preliminary classification such that 70%–90% of the total fines were concentrated in a portion of 5%–10% of the catalyst material diverted to the elutriator.

Some pellets and larger particles escape through the grid apertures together with the fines. These pellets and larger particles are recovered, as in conventional practice, in the elutriator 38. The volume of material to be handled by the elutriator, however, to maintain the chosen maximum concentration of fines in the circulating catalyst, decreases as the concentration of fines in the portion of circulating catalyst selectively separated and diverted to the elutriator increases. The elutriator of the apparatus illustrated is detailed in Fig. 4. The selectively separated and diverted portion of circulating catalyst, entering the elutriator 38 through connection 37, passes over a distributing baffle 39 into the upper end of a tube 40 within the outer shell of the elutriator. Part of the combustion gases escaping through stack manifolds 32 enters the lower end of the outer shell of the elutriator through connection 41. Part of these gases flows upwardly through the tube 40 and the balance flows upwardly through the annular space between tube 40 and the elutriator shell. Within the tube 40, the rising current of gases effects a classification of the introduced catalyst material, the fines flowing upwardly out of the upper end of the tube 40 whence they are swept on by the composite gas stream and the pellets and larger particles flowing downwardly through the collecting hopper 50 to the connection 51 discharging with connection 34 into the lower end of the elevator 35 (see Fig. 1). The composite gas stream from the elutriator joins the combustion gases discharged from the upper ends of the stack manifolds 32 and this mixture then passes through a series of cyclones 52 in which fines are separated and from which the separated fines are discharged through connection 53 and the remaining gas mixture passes through manifold 54 to stack 33.

In the foregoing I have described my invention as arranged for classification of regenerated catalyst. Although it is usually more advantageous to apply classification for elimination of fines to the regenerated cataylst, the apparatus of my invention can be arranged to classify spent catalyst. For this purpose, the classifying discharge chute is arranged at the head end of the elevator for lifting spent catalyst, elevator 28 in the apparatus illustrated, and an appropriate connection is provided for transferring pellets and larger particles separated in the elutriator either to the lower end of the elevator lifting spent catalyst, elevator 28 in the apparatus illustrated, or to the upper end of the regenerating kiln.

I claim:

1. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material downwardly along an inclined, elongated chute so as to cause a concentration of the fines along the underside of said stream, withdrawing contact material containing some of the largest sized particles along with said concentration of fines from the bottom of said chute at a location near its lower end at a rate amounting to only a minor fraction of the total rate of contact material flow through said chute, effecting the separation of fines from said withdrawn contact material and returning contact material containing said largest sized particles substantially freed of fines to the cyclically moving stream of contact material while excluding the return of said separated fines.

2. In a hydrocarbon conversion system embodying means for circulating particle-form contact material having a volume equivalent to that of spheres of the order of about 1/8 to 3/16 inch in diameter including a storage chamber, an elutriator, and an elevator for raising said contact material to an elevated location above said storage chamber and said elutriator, the combination of a chute adapted to receive the elevated contact material at its upper end and to convey the same downwardly to said storage chamber, the upper end portion of said chute comprising a classifying section having a flat bottom of such inclination and length as to effect a concentration of fines along the underside of a stream of contact material flowing thereover, said classifying section having an opening extending transversely across said flat bottom at a location adjacent to its lower end, a grid extending along the flat bottom of said classifying section and covering said opening, said grid comprising spaced parallel strap members set on edge and extending across said section transversely to the direction of flow, the sides of adjacent strap members being spaced approximately 1/8 of an inch, a plate member closing the underside of said grid from its uppermost end to a location adjacent to the uppermost edge of said opening, a receptacle immediately beneath said opening and having confining side walls attached at their upper edges about the perimeter of said opening, said grid being adapted to admit into said receptacle from said classifying section even the largest-size particles of said contact material, and a conduit connecting said receptacle to said elutriator, said conduit being adapted to withdraw only a minor portion of the total contact material passing down said chute.

LEROY F. STRADER.

References Cited in the file of this patent

UNITED STATES PATENTS

| Number | Name | Date |
|---|---|---|
| 781,493 | Clements et al. | Jan. 31, 1905 |
| 2,370,234 | Degnen et al. | Feb. 27, 1945 |
| 2,423,813 | Lechthaler et al. | July 8, 1947 |
| 2,434,843 | Fahnestock et al. | Jan. 20, 1948 |
| 2,441,311 | Crowley et al. | May 11, 1948 |

FOREIGN PATENTS

| Number | Country | Date |
|---|---|---|
| 61,062 | Denmark | June 28, 1943 |

OTHER REFERENCES

Perry, "Chemical Engineer's Handbook," 2d edition, pages 1706–1708.